United States Patent [19]

Gonzalez

[11] Patent Number: 5,326,067
[45] Date of Patent: Jul. 5, 1994

[54] QUICK RELEASE PEDESTAL

[75] Inventor: Jose M. Gonzalez, Cerritos, Calif.

[73] Assignee: Hi-Tech Seating Products, South Gate, Calif.

[21] Appl. No.: 930,719

[22] Filed: Aug. 14, 1992

[51] Int. Cl.⁵ .............................................. B60N 2/00
[52] U.S. Cl. ................. 248/503.1; 248/127; 296/65.1; 297/311; 297/440.22
[58] Field of Search ................. 248/503.1, 127, 221.3, 248/222.1; 297/452, 344, 349; 296/65.1

[56] References Cited

U.S. PATENT DOCUMENTS

| | | | |
|---|---|---|---|
| 3,933,330 | 1/1976 | Gwin | 248/371 |
| 4,759,580 | 7/1988 | Berklich, Jr. et al. | 296/65.1 |
| 4,773,693 | 9/1988 | Premji et al. | 296/65.1 |
| 4,805,952 | 2/1989 | Coleman | 296/65.1 |
| 5,125,711 | 6/1992 | Syed et al. | 248/503.1 |

Primary Examiner—Eugenia Jones
Assistant Examiner—Allan M. Schrock
Attorney, Agent, or Firm—Stetina and Brunda

[57] ABSTRACT

A quick release pedestal for a vehicle seat comprising a base member rigidly attachable to a floor portion of a vehicle and defining first and second pairs of elongate slots extending in spaced, parallel relation therein. Releasably attachable to the base member is a seat support member including a first pair of hook members oriented so as to be receivable into the first pair of slots and a second pair of hook members oriented so as to be receivable into the second pair of slots. The seat support member further includes a mechanism for releasing the seat support member from engagement to the base member when the first pair of hook members are received into the first pair of slots and the second pair of hook members received into the second pair of slots.

11 Claims, 4 Drawing Sheets

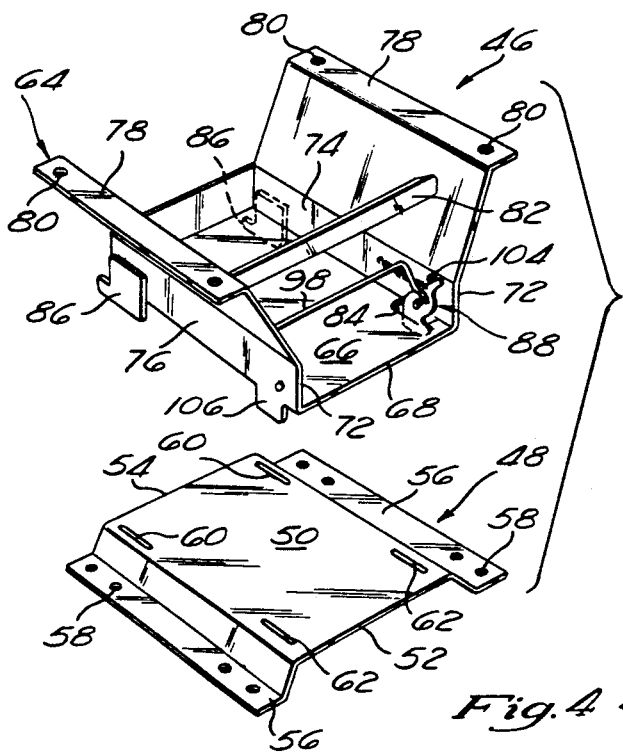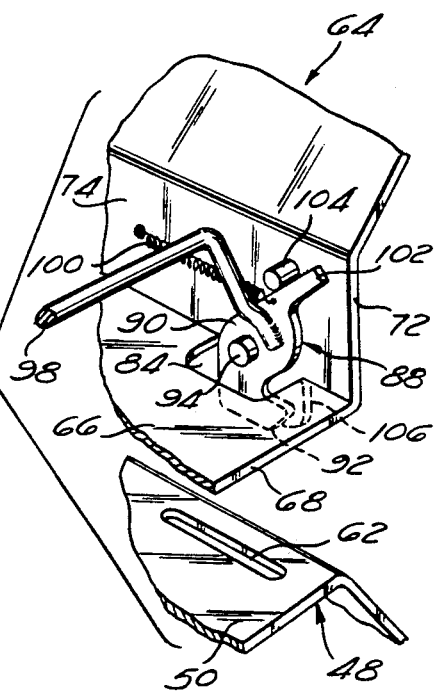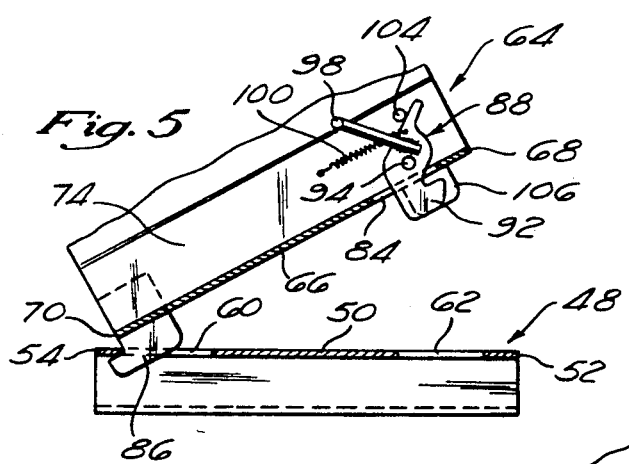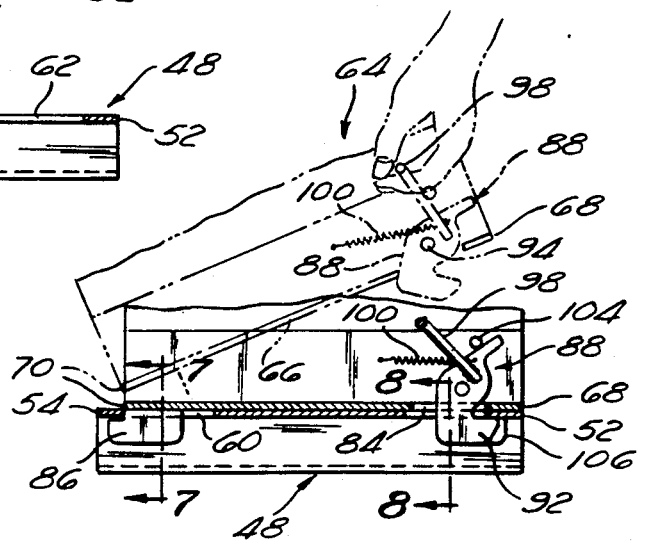

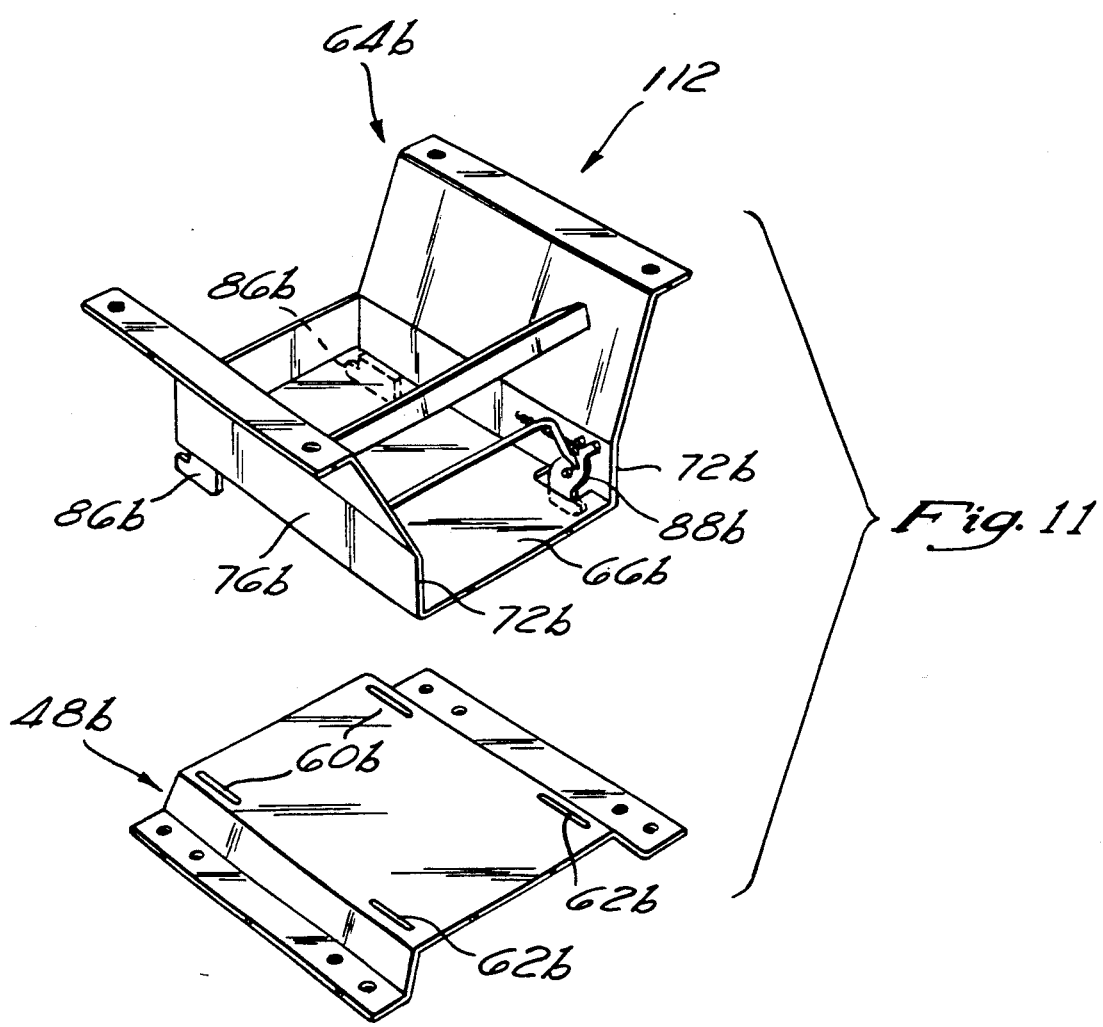

QUICK RELEASE PEDESTAL

FIELD OF THE INVENTION

The present invention relates generally to seat assemblies for mounting in motor vehicles, and more particularly to a quick release pedestal for allowing a vehicle seat to be selectively removed from within the interior of the vehicle.

BACKGROUND OF THE INVENTION

In motor vehicles such as vans or minibuses, it is oftentimes desirable to remove one or more of the vehicle seats from therewithin for purposes of increasing the available storage space or allowing easy access to the interior portions of the vehicle during cleaning. In the prior art, a number of release mechanisms have been developed for purposes of allowing one or more vehicle seats to be selectively removed from within the interior of the vehicle.

One such prior art release mechanism comprises a plate member which is attached to the floor portion of the vehicle and defines an elevated surface having a generally circular configuration. Disposed about the periphery of the elevated circular surface are a plurality of detents, while formed in the central portion of the elevated surface is a generally circular recessed portion. The elevated surface further includes a guide member extending upwardly therefrom and an aperture disposed therein. The prior art release mechanism further comprises a support member which is rigidly attached to the bottom of the vehicle seat and adapted to be releasably engageable to the base member. Similar to the base member, the bottom surface of the support member defines an elevated surface having a generally circular configuration. Disposed about the periphery of the elevated circular surface are a plurality of lock members, each of which are sized and oriented to be selectively receivable into a corresponding one of the detents disposed within the base member. Additionally, formed upon the central portion of the elevated surface is a raised portion which has a generally circular configuration and is sized to be receivable into the recessed portion of the base member in a nested fashion. The elevated surface of the support member further includes an arcuate slot disposed therein which is adapted to receive the guide member, and a spring-loaded pin member extending downwardly therefrom which is adapted to be receivable into the aperture of the base member.

In the prior art release mechanism, the vehicle seat is attached to the base member by orienting the seat such that each of the lock members of the support member is received into a corresponding one of the detents, and the raised portion of the support member is received into the recessed portion of the base member. To aid in achieving such alignment, the guide member is initially received into the arcuate slot of the support member. After the lock members have been received into the detents, the vehicle seat is rotated so as to cause a stem portion of each lock member to be received into a complimentary notch portion of each detent. When the stem portions of the lock members are fully received into the notch portions of the detents, the spring-loaded pin of the support member is received into the aperture of the base member. To remove the vehicle seat from the base member, the pin member is pulled upwardly so as to remove the same from within the aperture. Thereafter, the vehicle seat is rotated in a manner operable to remove the stem portions of the lock members from within the notch portions of the detents. The vehicle seat is then lifted upwardly so as to remove each of the lock members from within the detents.

As will be recognized, to engage the vehicle seat to the base member in the prior art release mechanism, the guide member must first be received into the arcuate slot, with each of the lock members then being properly oriented relative the detents and the raised portion being properly oriented relative the recessed portion. After each of these components has been aligned in the aforementioned manner and the lock members received into the detents, the vehicle seat is then rotated to rigidly secure the support member to the base member and to cause the spring-loaded pin to be received into the aperture. Additionally, the vehicle seat cannot be removed from the base member until the spring-loaded pin is pulled upwardly and removed from within the aperture and the seat rotated and lifted upwardly to remove the lock members from within the detents. Though the prior art release mechanism serves to removably attach the vehicle seat to the base member, such attachment and removal is a difficult and time-consuming task due to the necessity of having to properly align various components of the base member and support member. The present invention overcomes these and other deficiencies associated with prior art vehicle seat release mechanisms by providing a quick release pedestal which is configured to eliminate the necessity of having to properly orient large numbers of components to releasably secure the vehicle seat to its associated base member.

SUMMARY OF THE INVENTION

In accordance with a preferred embodiment of the present invention, there is provided a quick release pedestal for a vehicle seat. The pedestal generally comprises a base member which is rigidly attachable to a floor portion of the vehicle and defines a generally planar elevated surface having front and back edges. Disposed within the elevated surface adjacent the back edge is a first pair of elongate slots which extend in spaced, parallel relation. Additionally, disposed within the elevated surface adjacent the front edge is a second pair of elongate slots which also extend in spaced, parallel relation.

Releasably attachable to the base member is a seat support member. In the preferred embodiment, the seat support member comprises a generally planar lower plate portion which defines front and back edges and opposed side edges. Extending upwardly from the opposed side edges of the lower plate portion are first and second side wall portions, each of which define inner and outer surfaces. Additionally, disposed within the lower plate portion adjacent the front edge thereof is a third pair of elongate slots which extend in spaced, parallel relation between the first and second side wall portions.

The seat support member further comprises a first pair of hook members, each of which are rigidly attached to and extend downwardly from the outer surface of a respective one of the first and second side wall portions adjacent the back edge of the lower plate portion. When attached to their respective side wall portions, each of the hook members of the first pair are oriented so as to be receivable into a respective one of the slots of the first pair. The seat support member also includes a second pair of hook members, each of which includes an upper portion pivotally connected to the inner surface of a respective one of the first and second side wall portions adjacent the front edge of the lower plate portion, and a lower portion extending downwardly through a respective one of the slots of the third pair. When attached to the inner surfaces of the first and second side wall portions, the lower portion of each of the hook members of the second pair is oriented so as to be selectively receivable into a respective one of the slots of the second pair.

The quick release pedestal further includes a means for releasing the seat support member from engagement to the base member when the first pair of hook members are received into the first pair of slots and the second pair of hook members are received into the second pair of slots. In the preferred embodiment, the releasing means comprises an elongate handle member which is attached to and interconnects the second pair of hook members. The handle member is selectively movable between a locked position, whereat the lower portions of the second pair of hook members are maintained in engagement with the base member, and a release position whereat the lower portions of the second pair of hook members are pivoted away from the front edge of the elevated surface of the base member and released from engagement thereto. The releasing means further includes a means for biasing the handle member to the locked position which preferably comprises a pair of biasing springs extending between the hook members of the second pair and the inner surfaces of the side wall portions.

To aid the entry of the second pair of hook members into the second pair of slots, the support-member further includes a pair of guide members which are attached to and extend downwardly from the side wall portions of the support member. Particularly, each of the guide members is attached to the bottom surface in a manner wherein the outer surface of each guide member is substantially continuous with the outer surface of a corresponding side wall portion, and the inner surface of each guide member is abutted against the outer surface of a respective one of the hook members of the second pair. As an alternative to being attached to the side wall portions, each of the guide members may be formed as an integral portion of a respective one of the first and second side wall portions. Additionally, the seat support member may be formed so as not to include the guide members.

In a second embodiment of the present invention, the upper edges of the first and second side wall portions are adapted to have a swivel mechanism attached thereto in a manner wherein the swivel mechanism extends between the first and second side wall portions. In this regard, the swivel mechanism is used to provide the vehicle seat with rotational movement capability.

In a third embodiment of the present invention, each of the slots of the second pair disposed within the base member is in linear alignment with a corresponding slot of the first pair. Since the slots of the first and second pairs are linearly aligned, the first pair of hook members are attached to the bottom surface of the lower plate portion as opposed to the outer surfaces of the first and second side wall portions such that each of the hooks of the first pair is in linear alignment with a corresponding hook of the second pair.

BRIEF DESCRIPTION OF THE DRAWINGS

These as well as other features of the present invention will become more apparent upon reference to the drawings wherein:

FIG. 3 is an exploded view of the pedestal shown in FIG. 2;

FIG. 4 is a partial perspective view illustrating one of the pivoting hook members used to releasably attach the seat support member of the pedestal to the base member;

FIG. 5 is a cross-sectional view illustrating the manner in which the seat support member is engaged to the base member;

FIG. 6 is a cross-sectional view illustrating the manner in which the seat support member is released from its engagement to the base member;

FIG. 11 is an exploded view of a quick release pedestal constructed in accordance with a third embodiment of the present invention.

DETAILED DESCRIPTION OF THE PREFERRED EMBODIMENT

Figure 1:
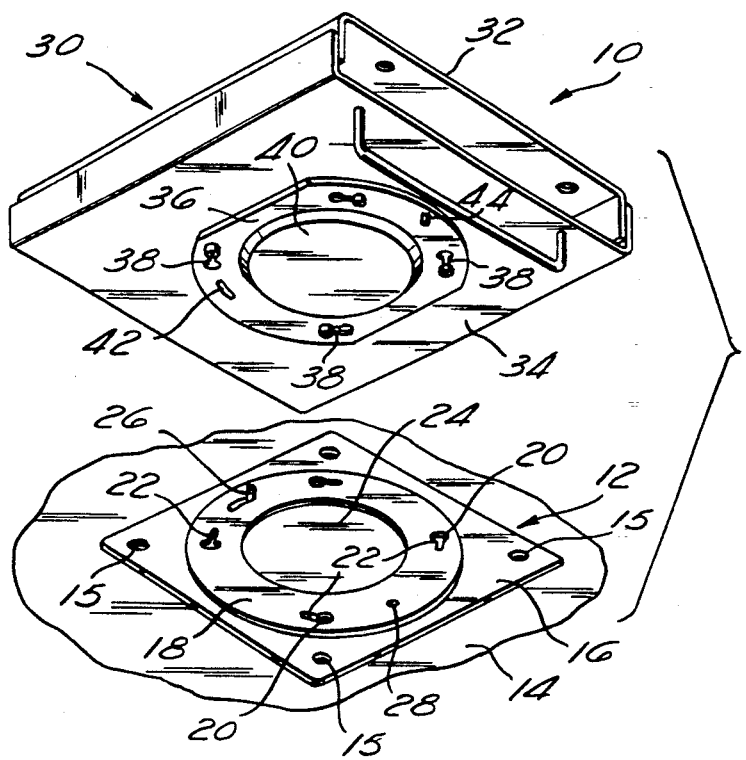
FIG. 1 is a perspective view of a prior art seat release mechanism.

Referring now to the drawings wherein the showings are for purposes of illustrating preferred embodiments of the present invention only, and not for purposes of limiting the same, FIG. 1 perspectively illustrates a prior art vehicle seat release mechanism 10. The prior art release mechanism 10 generally comprises a base member 12 which has a generally square configuration and is adapted to be secured to a floor portion 14 of a vehicle. Formed on and extending upwardly from the top surface 16 of the base member 12 is a first elevated portion 18 having a generally circular configuration. Disposed about the periphery of the first elevated portion 18 are four (4) generally circular detents 20, each of which includes a notch portion 22 associated therewith. Additionally, formed in the center of the first elevated portion 18 is a generally circular recessed portion 24 which extends downwardly to a depth substantially matching the height of the first elevated portion 18. The base member 12 is attached to the floor portion 14 via the use of fasteners, such as bolts, which are extended through apertures 15 disposed in the corner portions of the base member 12. Extending upwardly from the first elevated portion 18 between a pair of detents 20 is a guide member 26. The first elevated portion 18 further includes an aperture 28 disposed therein in an orientation diametrically opposite the guide member 26.

In addition to the base member 12, the release mechanism 10 also includes a support member 30 defining an upper surface 32 to which is attached the vehicle seat, and a generally planar lower surface 34. Formed on and extending downwardly from the lower surface 34 is a second elevated portion 36 also having a generally circular configuration. Formed about the periphery of the second elevated portion 36 and extending downwardly therefrom are four (4) lock members 38, each of which defines cylindrical shaft portion and an enlarged head portion. Importantly, each of the lock members 38 is oriented upon the second elevated portion 36 so as to be receivable into a corresponding one of the detents 20. Formed on and extending downwardly from the center of the second elevated portion 36 is a raised portion 40 which is sized and configured to be receivable into the recessed portion 24 in nested fashion. Also disposed within the second elevated portion 36 between a pair of the lock members 38 is an arcuate slot 42 which is adapted to receive the guide member 26. Additionally, extending downwardly from the second elevated portion 36 is a spring-loaded pin 44 which may be selectively pulled upwardly into the second elevated portion 36 via a handle (not shown) disposed within the support member 30.

In the prior art release mechanism 10, the support member 30 and hence the vehicle seat are attached to the base member 12 by inserting the lock members 38 into the detents 20 and the raised portion 40 into the recessed portion 24. In this regard, the guide member 26 is initially inserted into the arcuate slot 42 to aid in properly orienting the lock members 38 relative the detents 20. Once the guide member 26 has been received into the arcuate slot 42, and each of the lock members 38 received into the detents 20, the vehicle seat is rotated in a clockwise direction so as to cause the stem portions of the lock members 38 to be received into the notch portions 22 of the detents 20. When the stem portions are fully received into the notch portions 22, the spring-loaded pin 44 is axially aligned with and actuates downwardly into the aperture 28, thus signifying that the support member 30 is properly engaged to the base member 12. To remove the support member 30 from the base member 12, the pin 44 is pulled upwardly via the handle disposed within the support member 30, and the vehicle seat rotated in a counter-clockwise direction to remove the stem portions of the lock members 38 from within the notch portions 22 of the detents 20. Thereafter, the vehicle seat is raised vertically upwardly so as to remove the lock members 38 from within the detents 20 and the guide member 26 from within the slot 42.

As will be recognized, the aforementioned manner of attaching the support member 30 to the base member 12 necessitates inserting the guide member 26 into the arcuate slot 42 and placing each of the lock members 38 into axial alignment with a respective one of the detents 20. Thereafter, the vehicle seat must be rotated until the pin 44 engages the aperture 28. To remove the support member 30 from the base member 12, the pin 44 must be removed from within the aperture 28 and the vehicle seat once again rotated and lifted vertically upwardly. As can be appreciated, these attachment and removal processes are both difficult and time consuming since a plurality of components must be properly aligned and received into each other.

Figure 2:
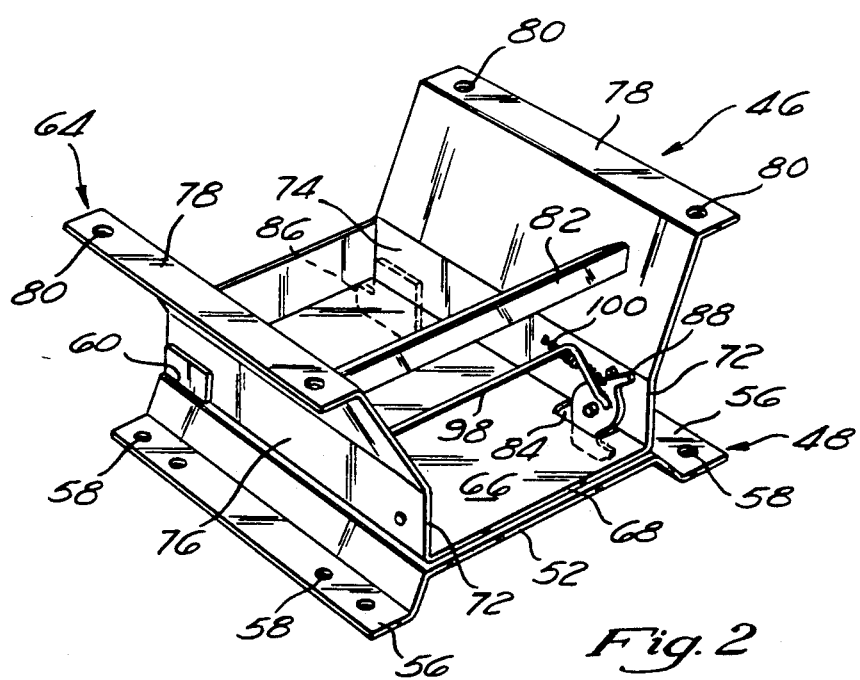
FIG. 2 is a perspective view of the quick release pedestal constructed in accordance with a first embodiment of the present invention.

Referring now to FIGS. 2 and 3, illustrated is a quick release pedestal 46 for a vehicle seat which is constructed in accordance with a first embodiment of the present invention. In the first embodiment, pedestal 46 comprises a base member 48 which defines a generally planar elevated surface 50 having a front edge 52 and a back edge 54. Extending longitudinally along each of the opposed side edges of the elevated surface 50 is a flange portion 56. In the first embodiment, the base member 48 is rigidly secured to a floor portion of the vehicle via the receipt of fasteners, such as bolts, into apertures 58 which are disposed within each flange portion 56. Disposed within the elevated surface 50 adjacent the back edge 54 is a first pair of elongate slots 60 which extend in spaced, parallel relation. Also disposed within the elevated surface 50 adjacent the front edge 52 is a second pair of elongate slots 62 which extend in spaced, parallel relation. As seen in FIG. 3, the distance separating the slots 62 of the second pair is less than the distance separating the slots 60 of the first pair. The purpose for decreasing the distance separating the slots 62 will be explained below. In the first embodiment, the base member 48 is fabricated from steel.

Releasably attachable to the base member 48 is a seat support member 64. In the first embodiment, the seat support member 64 comprises a generally planar lower plate portion 66 having a front edge 68 and back edge 70. Extending upwardly from the opposed side edges of the lower plate portion 66 are first and second identically configured side wall portions 72, each of which defines an inner surface 74 and an outer surface 76. The side wall portions 72 each have a flared configuration and include a flange 78 extending longitudinally along the upper edge thereof. The vehicle seat is attached to the seat support member 64 via the receipt of fasteners, such as bolts or screws, into the apertures 80 disposed within each flange 78. Additionally, attached to and extending between the side wall portions 72 is a support strut 82 which is used to provide the seat support member 64 with enhanced structural integrity.

Figure 7:
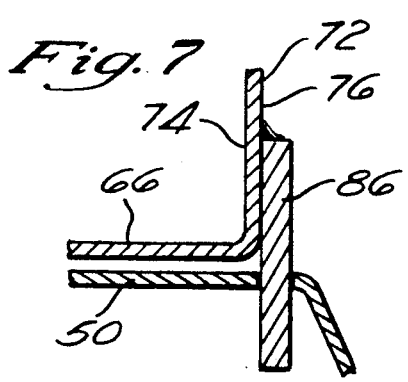
FIG. 7 is a cross-sectional view taken along line 7—7 of FIG. 6.

Disposed within the lower plate portion 66 adjacent the front edge 68 thereof is a third pair of elongate slots 84 which extend in spaced, parallel relation between the side wall portions 72. The seat support member 64 further includes a first pair of hook members 86, each of which are rigidly attached to and extend downwardly from the outer surface 76 of a respective one of the side wall portions 72 adjacent the back edge 70 of the lower plate portion 66, as seen in FIG. 7. As best seen in FIGS. 5 and 6, the hook members 86 of the first pair are attached to the outer surfaces 76 of the side wall portions 72 in a manner wherein engagement portions 87 of each of the hook members 86 extend rearwardly relative the back edge 70 of the lower plate portion 66. Additionally, the hook members 86 are oriented so as to be receivable into the first pair of slots 60 disposed within the elevated surface 50 of the base member 48.

Figure 10:
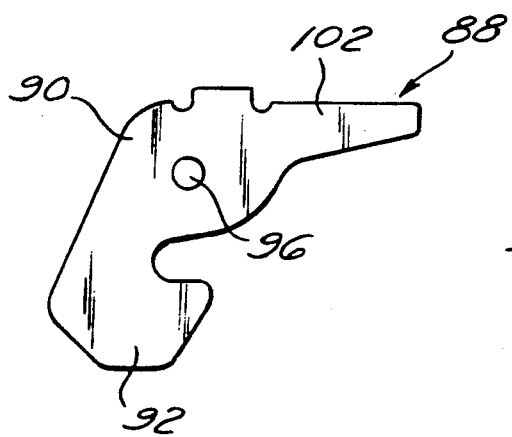
FIG. 10 is a front elevational view of a pivoting hook member used in the first and second embodiments of the present invention.

Referring now to FIGS. 4 and 10, the seat support member 64 further includes a second pair of hook members 88, each of which includes an upper portion 90 pivotally connected to the inner surface 74 of a respective one of the side wall portions 72 adjacent the front edge 68 of the lower plate portion 66, and a lower portion 92 extending downwardly through a respective one of the slots 84 of the third pair. The lower portion 92 of each hook number 88 includes an engagement portion 93 which extends forwardly toward the front edge 68 of the lower plate portion 66. As such, the engagement portions 87, 93 of the hook members 86, 88 extend in opposite directions. Importantly, the hook members 88 of the second pair are oriented so as to be receivable into the second pair of slots 62 disposed within the base member 48. Each of the hook members 88 is pivotally connected to the inner surface 74 of a corresponding side wall portion 72 via a pivot pin 94 which extends inwardly from the inner surface 74 and through a complimentary aperture 96 disposed within the upper portion 90 of the hook member 88.

In the first embodiment, the hook members 88 of the second pair are interconnected by an elongate handle member 98 which is rigidly attached to each of the hook members 88. As seen in FIG. 6, the handle member 98 is selectively movable between a locked position whereat the lower portions 92 of the hook members 88 are maintained in engagement with the elevated surface 50 of the base member 48 when received into the second pair of slots 62, and a release position whereat the lower portions 92 of the hook members 88 are pivoted away from the front edge 52 of the elevated surface 50 so as to be releasable from engagement to the base member 48. The handle member 98 is normally biased to the locked position via a pair of biasing springs 100 which extend between the upper portions 90 of the hook members 83 and the inner surfaces 74 of the side wall portions 72. As best seen in FIG. 4, the biasing of the handle member 98 toward the locked position via the biasing springs 100 causes an (extension 102) formed as part of the upper portion 90 of each hook member 88 to come into abutting engagement with a corresponding stop pin 104 disposed within the side wall portion 72 and extending inwardly from the inner surface 74 thereof. As also seen in FIG. 6, the handle member 98 is actuated from the locked position to the release position by pulling the same forwardly toward the front edge 68 of the lower plate portion 66 with a force sufficient to overcome the biasing force exerted by the biasing springs 100. When the handle member 98 is actuated to the release position, the extensions 102 formed on the upper portions 90 of the lock members 88 rotate in a clockwise direction and are removed from their abutting engagement to the stop pins 104.

Figure 8:
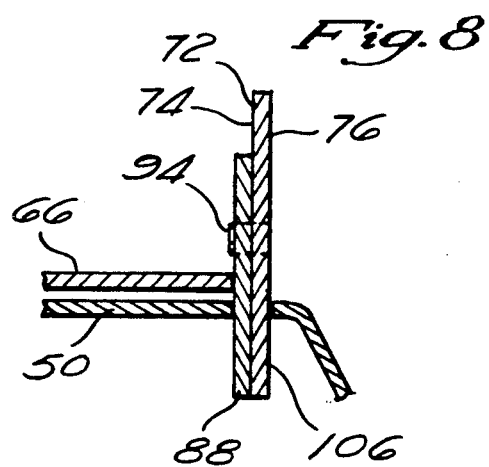
FIG. 8 is a cross-sectional view taken along line 8—8 of FIG. 6.

Referring now to FIGS. 3 and 8, in the first embodiment, the seat support member 64 further includes a pair of planar guide members 106 which extend downwardly from the side wall portions 72 in a manner wherein the outer surface of each guide member 106 is substantially continuous with the outer surface 76 of a respective one of side wall portions 72, and the inner surface of each guide member 106 is in abutting contact with the outer surface of a respective one of the hook members 88 of the second pair. When the seat support member 64 is releasably engaged to the base member 48, the hook members 88 of the second pair and their associated guide members 106 are received into the slots 62 of the second pair. Since the slots 60 of the first pair and the slots 62 of the second pair are preferably of equal width, the combined width of each hook member 88 and its associated guide member 106 is approximately equal to the overall width of each hook member 86 of the first pair, as seen in FIGS. 7 and 8. As such, the width of each hook member 88 is approximately half that of each hook member 86. In the preferred embodiment, the guide members 106 are integral with the side wall portions 72, as seen in FIG. 3, and are formed by downwardly bending the cutouts made in the lower plate portion 66 during the formation of the third pair of slots 84. As such, the configurations of the guide members 106 and slots 84 of the third pair are identical. Alternatively, the guide members 106 may be attached to the side wall portions 72 via a weld, as seen in FIG. 8.

Referring now to FIG. 5, the seat support member 64, and hence the vehicle seat, is attached to the base member 48 by initially inserting the first pair of hook members 86 into the first pair of slots 60. Thereafter, the vehicle seat is pivoted forwardly so as to cause the second pair of hook members 88 to be received into the second pair of slots 62. Advantageously, the receipt of the hook members 86 into the first pair of slots 60 automatically places the second pair of hook members 88 and their associated guide members 106 into proper alignment with the second pair of slots 62 when the vehicle seat is pivoted forwardly. As seen in FIG. 10, the lower portion 92 of each hook member 88 is configured so as to allow the hook members 88 to be received into the second pair of slots 62 without having to actuate the handle member 98 to the release position. When the hook members 88 of the second pair are fully received into the second pair of slots 62, the lower portions 92 of the hook members 88, and more particularly the engagement portions 93 thereof, are engaged to the elevated surface 50 of the base member 48 in the manner shown in FIG. 6 and extend toward the front edge 52 thereof. Additionally, the engagement portions 87 of the hook members 86 extend underneath the elevated surface 50 toward the back edge 54 thereof when the hook members 86 are fully received into the first pair of slots 60.

To remove the seat support member 64 from the base member 48, the handle member 98 is pulled toward the front edge 68 of the lower plate portion 66, thereby causing the lower portions 92 of the hook members 88 to pivot away from the front edge 52 of the elevated surface 50. Thereafter, the seat support members 64 is pivoted rearwardly in the manner shown in FIG. 6, with the first pair of hook members 86 being subsequently removed from within the first pair of slots 60. As will be recognized, the structure of the base member 48 and seat support member 64 eliminates the need to properly orient and align large numbers of components to releasably attach the base member 48 and seat support member 64 to each other. As such, the removal of the seat support member 64 from the base member 48 and subsequent reattachment thereto is accomplished in a short amount of time with minimal difficulty.

Figure 9:
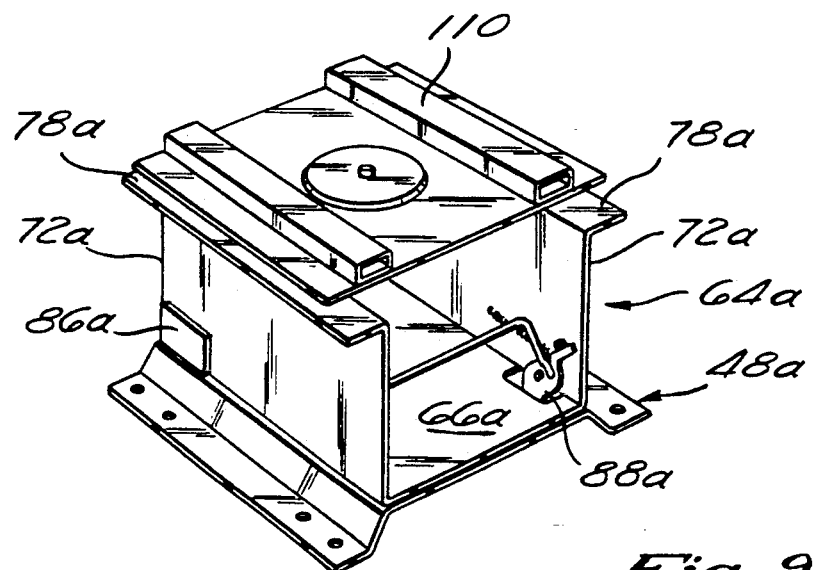
FIG. 9 is a perspective view of a quick release pedestal constructed in accordance with a second embodiment of the present invention.

Referring now to FIG. 9, illustrated is a quick release pedestal 108 constructed in accordance with a second embodiment of the present invention. In the second embodiment, pedestal 108 includes a base member 48a which is substantially identical to the base member 48 previously described, except that the width of the elevated surface of the base member 48a is slightly less than the width of the elevated surface 50 of the base member 48. Releasably attachable to the base member 48a is a seat support member 64a. Like the seat support member 64 previously described, seat support member 64a includes a lower plate portion 66a including first and second side wall portions 72a extending upwardly from the opposed side edges thereof. Unlike the side wall portions 72, the side wall portions 72a do not have a flared configuration and extend generally perpendicularly relative the lower plate portion 66a. Formed on and extending along the top edges of the side wall portions 72a are flanges 78a. In the second embodiment, the configuration of the seat support member 64a is adapted to allow a swivel mechanism 110 to be attached to and extend between the flanges 78a of the side wall portions 72a. Like the seat support member 64, the seat support member 64a includes a first pair of hook members 86a and a second pair of hook members 88a, which are configured and interfaced to the side wall portions 72a in the same manner previously described with respect to the first embodiment, and are also engaged to the slots within the base member 48a in the same manner previously described.

Referring now to FIG. 11, illustrated is a quick release pedestal 112 formed in accordance with a third embodiment of the present invention. In the third embodiment, the pedestal 112 includes a base member 48b which is substantially similar to the base member 48 previously described, except that each of the slots 60b of the first pair are in linear alignment with a corresponding one of the slots 62b of the second pair. The seat support member 64b of the pedestal 112 is similar to the seat support member 64 previously described, except that each of the hook members 86b of the first pair are attached to the bottom surface of the lower plate portion 66b rather than to the outer surfaces 76b of the first and second side wall portions 72b. As also seen in FIG. 11, no guide members are included with the seat support member 64b. In this respect, the width of each of the hook members 88b is substantially equal to the width of the hook members 86b. However, it will be recognized that the seat support member 64b may include guide members, with the overall width of each hook member 88b and its associated guide member being substantially equal to the width of one of the hook members 86b. Due to the attachment of the hook members 86b of the first pair directly to the bottom surface of the lower plate portion 60b, the first and second pairs of slots 60b, 62b may be linearly aligned as previously described.

Additional modifications and improvements of the present invention may also be apparent to those skilled in the art. Thus, the particular combination of parts described and illustrated herein is intended to represent only certain embodiments of the invention, and is not intended to serve as limitations of alternative devices within the spirit and scope of the invention.

What is claimed is:

1. A quick release pedestal for a vehicle seat, comprising:
   a base member rigidly attachable to a floor portion of a vehicle and defining front and back edges, a first pair of elongate slots extending in spaced, parallel relation normal to the back edge and a second pair of elongate slots extending in spaced, parallel relation normal to the front edge; and
   a seat support member releasably attachable to said base member including:
   a first pair of hook members adapted to be receivable into said first pair of slots, each of the first pair of hook members defining an engagement portion which extends rearwardly toward the back edge of the base member when the second pair of hook members are received in said second pair of slots;
   a second pair of hook members adapted to be receivable into said second pair of slots, each of the second pair of hook members defining an engagement portion which extends forwardly toward the front edge of and is abutted against the base member when the second pair of hook members are received in said second pair of slot members; and
   a release mechanism attached to and interconnecting the second pair of hook members for selectively releasing said seat support member from engagement to said base member when said first pair of hook members are received into said first pair of slots and said second pair of hook members are received into said second pair of slots;
   said seat support member further including:
   a generally planar lower plate portion having front and back edges and opposed side edges;
   first and second side wall portions having inner and outer surfaces and extending upwardly from the opposed side edges of said lower plate portion; and
   a third pair of elongate slots disposed within said lower plate portion adjacent the front edge thereof and extending in spaced, parallel relation between said first and second side wall portions, each of the second pair of hook members extending through a respective one of said third pair of elongate slots.

2. The device of claim 1 wherein said base member further defines a pair of flange portions attachable to said floor portion and a generally planar elevated surface extending between said flange portions, said first and second pairs of slots being disposed within said elevated surface.

3. The device of claim 2 wherein
   each of the first pair of hook members is rigidly attached to and extends downwardly from the outer surface of a respective one of said side wall portions adjacent the back edge of the lower plate portion so as to be receivable into a respective one of the first pair of slots, and each of said second pair of hook members includes an upper portion pivotally connected to the inner surface of a respective one of said side wall portions adjacent the front edge of the lower plate portion and a lower portion extending downwardly through a respective one of said third pair of slots so as to be receivable into a respective one of said second pair of slots, the engagement portions of the second pair of hook members extending forwardly from the lower portions thereof.

4. The device of claim 3 wherein said release mechanism comprises an elongate handle member selectively movable between a locked position wherein the engagement portions of the second pair of hook members are maintained in engagement with the base member and a release position wherein the engagement portions of the second pair of hook members are pivoted away from the front edge of the base member and released from engagement thereto, the movement from the locked position to the unlocked position being facilitated by pulling the handle member forwardly toward the front edge of the base member.

5. The device of claim 4 wherein said release mechanism further includes a means for biasing the handle member tot he locked position.

6. The device of claim 5 wherein said biasing means comprises a pair of spring members extending between the upper portions of said second pair of hook members and the inner surfaces of said side wall portions.

7. The device of claim 3 wherein said seat support member further comprises a pair of guide members having inner and outer surfaces and being attached to and extending downwardly from said side wall portions wherein the outer surface of each guide member is substantially continuous with the outer surface of a respective one of the side wall portions and the inner surface of each guide member is in abutting contact with a respective one of the second pair of hook members.

8. The device of claim 7 wherein said guide members are formed on and integral with said side wall portions.

9. The device of claim 3 wherein each of the second pair of slots is in linear alignment with a corresponding one of the first pair of slots.

10. The device of claim 3 further comprising a swivel mechanism attached to and extending between said first and second side wall portions.

11. The device of claim 1 wherein said first pair of hook members is attached to said lower plate portion.

* * * * *